June 17, 1924.
G. T. PARSLEY
BRAKE PULL INDICATOR
Filed May 12, 1923
1,498,289
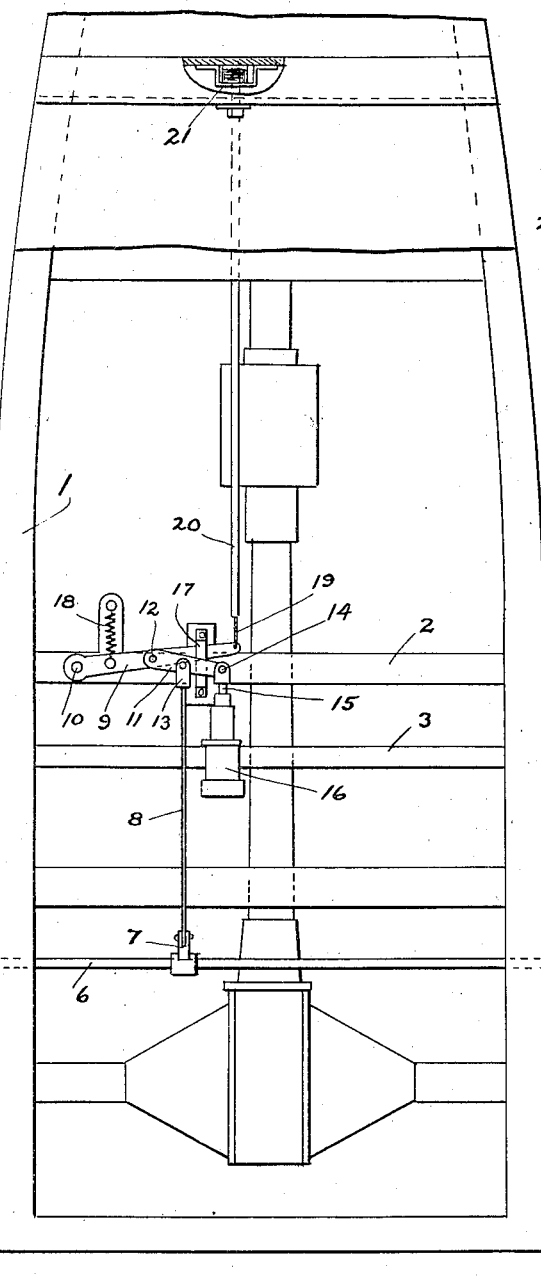
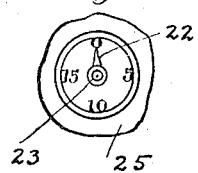
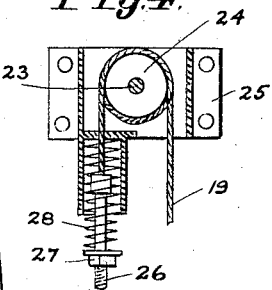
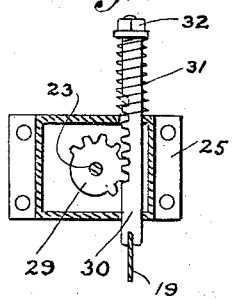
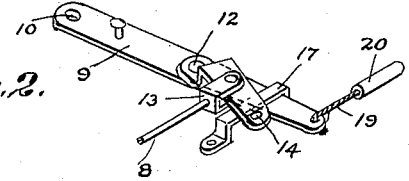
INVENTOR.
George T. Parsley,
BY
ATTORNEYS.

Patented June 17, 1924.

1,498,289

UNITED STATES PATENT OFFICE.

GEORGE T. PARSLEY, OF ASHLAND, OREGON.

BRAKE-PULL INDICATOR.

Application filed May 12, 1923. Serial No. 638,629.

*To all whom it may concern:*

Be it known that I, GEORGE T. PARSLEY, a citizen of the United States, and a resident of Ashland, county of Jackson, State of Oregon, have invented a new and useful Brake-Pull Indicator, of which the following is a specification.

This invention relates to indicators for registering the pull or pressure of a brake mechanism, so that the set of the brake at any time may be determined by referring to an indicator dial, and it has for its particular objects such an indicator which is adapted for placing upon an automobile or other vehicle, and connected to the brake rod or other brake mechanism, with its indicating dial on the dash in plain view of the vehicle operator, and further, a device though adaptable for use with any form of brake is particularly adaptable for use with the many types of mechanical brakes, especially the so-called "electric" brake.

I obtain the result above outlined by the device illustrated in the drawing forming a part of this application, and in which Figure 1 is a plan view of an automobile chassis including a portion of the dash and showing my brake pull indicator installed and connected, in this instance to an "electric brake."

Figure 2 is a perspective sketch of the co-acting levers showing a portion each of the brake rod and indicator cord secured thereto.

Figure 3 is an elevation front view of the indicator dial which is to be secured to the dash.

Figures 4 and 5 show optional means of operating the indicator pointer from the cord leading to the leverage system.

In further detail in Figure 1 the auto body frame is shown at (1) with certain transverse members, of which those concerning this application are numbered (2) and (3).

At (4)—(4) are shown the rear wheels of the auto with the brake bands indicated at (5)—(5). At (6) is shown the usual transverse shaft which operates the brake bands, and at (7) a crank connecting it to the brake pull rod (8).

The rod (8) is normally the rod which connects with the hand or foot lever for manipulation by the vehicle driver, but in this instance it is shown connected to a leverage system comprising a lever (9) pivotally anchored at (10) to the cross member (2), with another lever (11) pivoted to the first lever at (12), the lever (11) carrying near its center a pivoted connection (13) secured to the pull rod (8), and at its extreme end (14) is connected to the push rod (15) of any form of mechanical brake pusher as indicated at (16). This device (16), known as an "electric brake," is secured to the transverse frame member (3). It represents an electrically operated plunger push rod mechanism now on the market and forming no part of my invention except in so far as it functions to operate the same.

The lever (9) works in a guide (17), and is normally pulled against the end of the guide by a strong spring (18).

In Figure 2, a perspective sketch of the lever system, the elements and connections just described are similarly numbered and their relation clearly shown.

To the end of the lever (9) is secured a small wire cord (19) passing through a tube (20) running forward to the indicator dial on the dash, shown through a broken portion of the drawing at (21).

The face of the dial is substantially as shown in Figure 3 and consists of suitable indicating marks or numbers as shown with a rotatable pointer (22) secured to a pointer shaft (23) the mechanism being inclosed in a case indicated at (25).

The construction of the mechanism under the dial may be varied considerably without departing from the spirit of my invention, and I herewith show in Figures 4 and 5 two of the simpler arrangements. Both figures are cross-sections through the case (25) just under the dial and show all important elements.

In reference to Figure 4, the cord (19) is shown making a turn or two about a small drum (24) secured to the pointer shaft (23). The final end of the cord is secured to a rod (26) threaded at its outer end and provided with a nut (27) for adjustment to take up slack or alter the tension on the cord. The nut works against a spiral spring (28) reacting against the casing as shown, to keep the cord taut.

The structure in Figure 5 functions the same, but dispenses with the drum and substitutes a gear (29) secured to the pointer shaft (23) which is rotated by a toothed rack (30) engaging the gear and operating up and down in the casing (25). Surrounding the rack is a spiral spring (31)

bearing against a nut (32) threaded to the end of the rack and reacting against the casing to keep the cord taut, being the same office as the spring shown in Figure 4.

The operation of my device is as follows:

Upon energizing the electric or power brake (16), its push rod (15) is forcibly extruded and pushes the end of the lever (11) away and also carries with it the rod (8) thus turning the shaft (6) and applying the brakes (5) to the wheels (4). The lever (11) being pivoted at (12) to lever (9) pulls the latter downward on its pivot (10) and against the tension of the spring (18); the spring (18) being of a strength to withstand the maximum pull put upon the rod (8) by the "electric brake" (16); and the end of lever (9) being connected to the cord (19) pulls the latter through the cover pipe (20) and actuates the indicator pointer by revolving its shaft, either through the means shown in Figure 4 or the arrangement shown in Figure 5.

The spring (28) or (31) in either indicator mechanism keeps the cord taut, the nut adjustment serving to insure this and also through pulling of the cord to turn the pointer shaft for changing the setting of the pointer on the dial, so that when there is no pull on the rod (8), the pointer will indicate zero.

It will thus be seen that the greater the force exerted by the "electric brake" against the end of the lever (11) the greater will be the tension on the pull rod (8) and consequent greater depression of lever (9).

The cord (19) being pulled a distance depending on the pressure exerted by the mechanical pusher will of course turn the pointer of the indicator a proportionate distance and there record the brake pressure in whatever terms the dial may be graduated in.

It is of course apparent that the device may be used with any form of power or hand operated brake by slight modification of its connection to a convenient brake rod.

I claim:

1. In a brake mechanism, an actuating tension member for operating the brake, a motion indicator, compensating mechanism connecting the indicator with the tension member adapted to transmit a movement to the indicator proportionate to the tension on the member.

2. A brake pull indicator for vehicles, comprising a brake pull rod, a pull indicator, an actuating device extending from said indicator adapted for operating the indicator, a yielding connection between said device and said pull rod whereby the device is actuated in proportion to the pull put upon the rod.

3. In a vehicle brake, actuating mechanism therefor including a lever connected to said mechanism, means for operating said lever to actuate the brake, a second lever to which the first lever is fulcrumed, an indicator for indicating the degree of actuation of the brake, means connecting said second lever and said indicator for operation of the indicator.

4. In an automobile, a brake on a wheel thereof, a rod for operating the brake, a device for tensioning said rod, an indicator located on the automobile remote from the brake, a movable pointer on said indicator, means for moving said pointer embracing a flexible device extending from the indicator and connected for operation with the rod.

5. In a vehicle brake, a pressure lever connected to the brake to operate it, a second lever to which the first lever is fulcrumed, said second lever being movable to yield to pressure applied to the first lever, means for applying pressure to the first lever, resilient means for restricting movement of the second lever and means for indicating the movement of the second lever.

6. In a vehicle brake, a pressure lever connected to the brake to operate it, a second lever to which the first lever is fulcrumed, said second lever being movable to yield to pressure applied to the first lever, means for applying pressure to the first lever, resilient means for restricting movement of the second lever, and means for indicating the movement of the second lever, comprising a dial with a movable pointer thereon, and a flexible device extending from the second lever to the dial and operatively connected for moving the pointer around the dial.

GEORGE T. PARSLEY.